United States Patent [19]

Hashimoto et al.

[11] Patent Number: 4,621,906
[45] Date of Patent: Nov. 11, 1986

[54] AUTO-FOCUS ZOOM LENS ASSEMBLY

[75] Inventors: Akihiko Hashimoto, Tokyo; Hitoshi Shirai, Sagamihara; Kazutoshi Shiratori, Tokyo, all of Japan

[73] Assignee: Olympus Optical, Tokyo, Japan

[21] Appl. No.: 716,527

[22] Filed: Mar. 27, 1985

Related U.S. Application Data

[63] Continuation of Ser. No. 372,698, Apr. 28, 1982, abandoned.

[30] Foreign Application Priority Data

May 14, 1981 [JP] Japan .................. 56-72740

[51] Int. Cl.⁴ .................................... G02B 7/11
[52] U.S. Cl. ................................. 350/429
[58] Field of Search ................. 350/429, 430; 250/201 AF; 354/403

[56] References Cited

U.S. PATENT DOCUMENTS

| | | | |
|---|---|---|---|
| 4,008,951 | 2/1977 | Himmelsbach . | |
| 4,183,639 | 1/1980 | Suwa | 354/195 |
| 4,185,191 | 1/1980 | Stauffer . | |
| 4,209,241 | 6/1980 | Nanba et al. . | |
| 4,288,152 | 9/1981 | Matsuda | 250/201 AF |
| 4,351,590 | 9/1982 | Hirata et al. | 354/403 X |
| 4,357,085 | 11/1982 | Niwa et al. | 350/423 X |

FOREIGN PATENT DOCUMENTS

| | | |
|---|---|---|
| 2458893 | 6/1975 | Fed. Rep. of Germany . |
| 2653929 | 6/1977 | Fed. Rep. of Germany . |
| 2820964 | 11/1979 | Fed. Rep. of Germany ...... 350/429 |
| 2832963 | 2/1980 | Fed. Rep. of Germany . |
| 0020914 | 1/1981 | Fed. Rep. of Germany ...... 350/429 |
| 54-92726 | 7/1979 | Japan . |

Primary Examiner—John K. Corbin
Assistant Examiner—Loha Ben
Attorney, Agent, or Firm—Frishauf, Holtz, Goodman & Woodward

[57] ABSTRACT

A zoom lens assembly with an auto-focus function includes first and second lens groups, and a control device for causing a drive mechanism to rotate a distance-presetting ring which moves one of the lens groups, to adjust a focus in accordance with a signal sent from a light-receiving element for indicating the focused state of a foreground object. A line pattern substrate is arranged to move with the distance-presetting ring. A change in the focal length caused by the rotation of a zoom ring is sensed by a substrate detecting element which informs the control device of that extent to which the distance-presetting ring is to be rotated in order to assure a proper focus notwithstanding the changed focal length. The corrective rotation of the distance-presetting ring is detected by movement of the line pattern substrate relative to the detecting element. The light-receiving element is supplied with a beam of light reflected from the foreground object through the first and second groups of lenses.

12 Claims, 22 Drawing Figures

F I G. 1
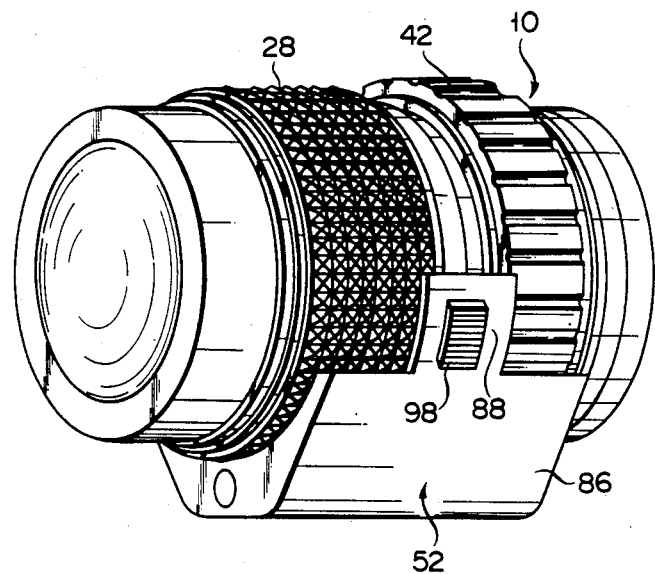
F I G. 2
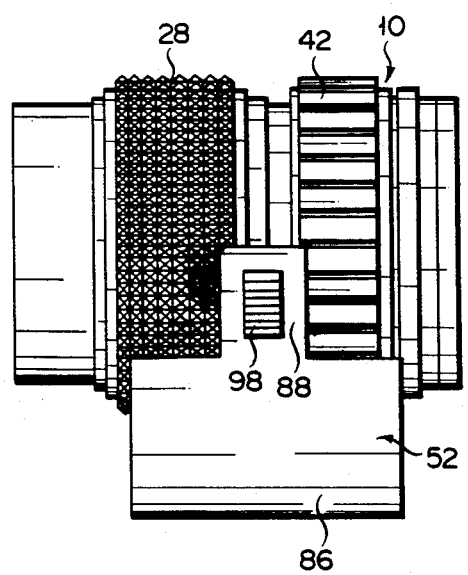

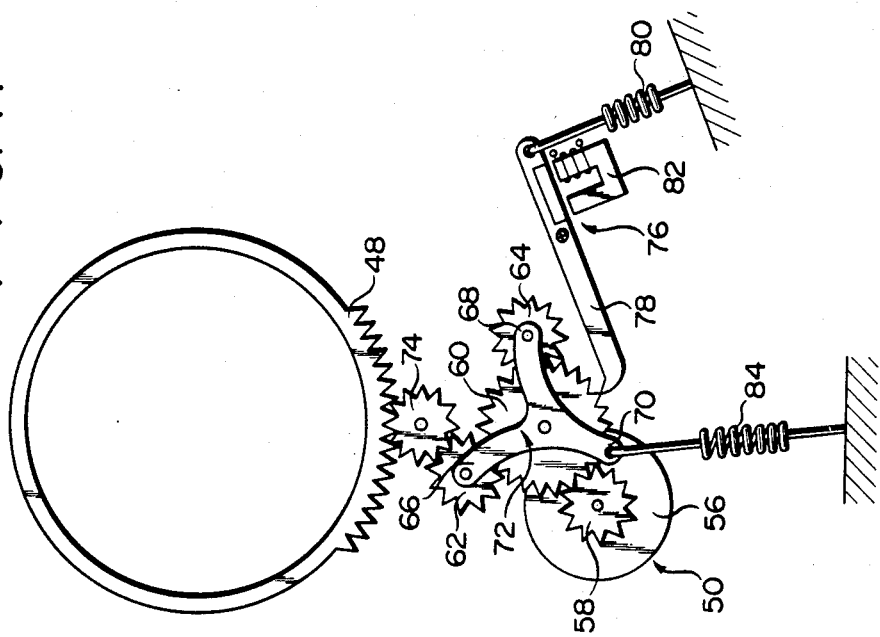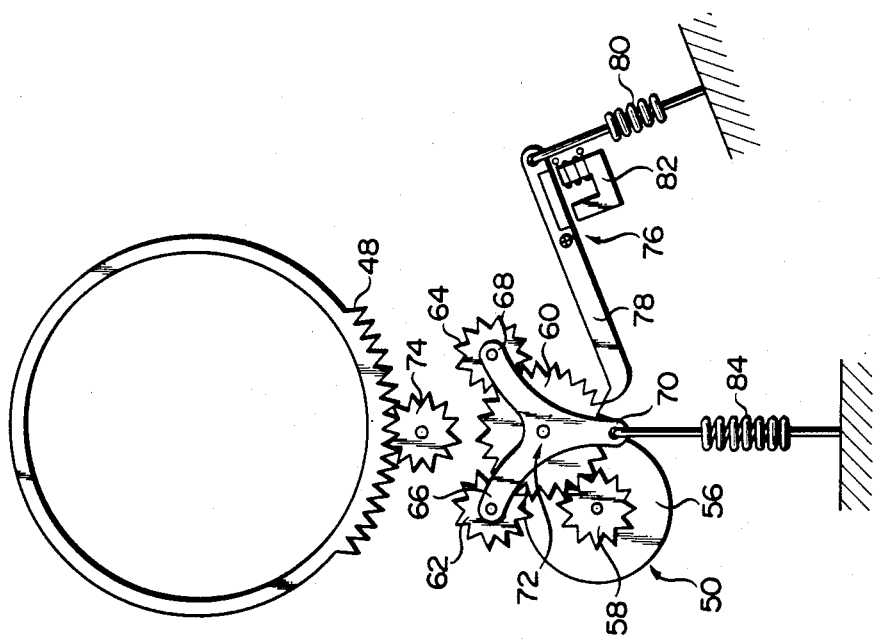

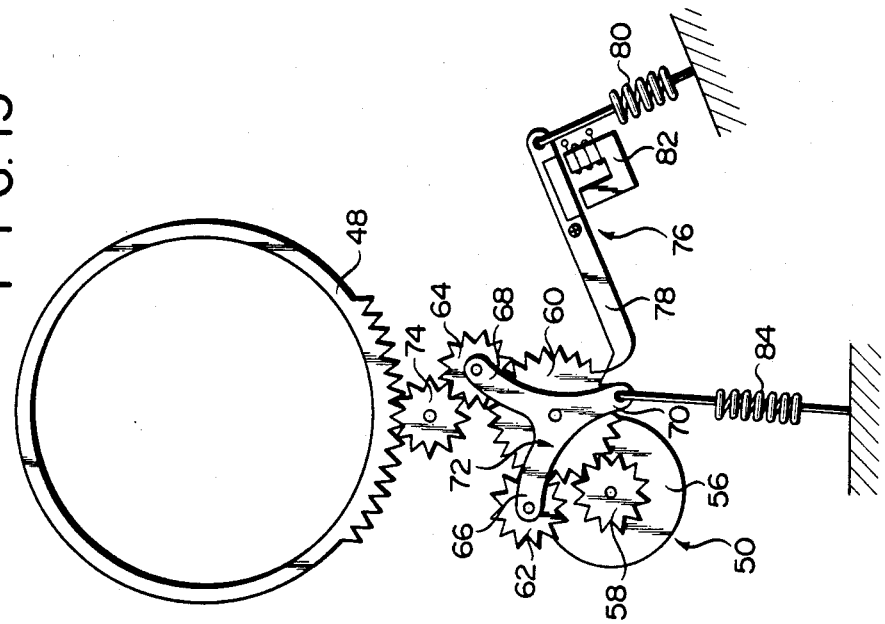
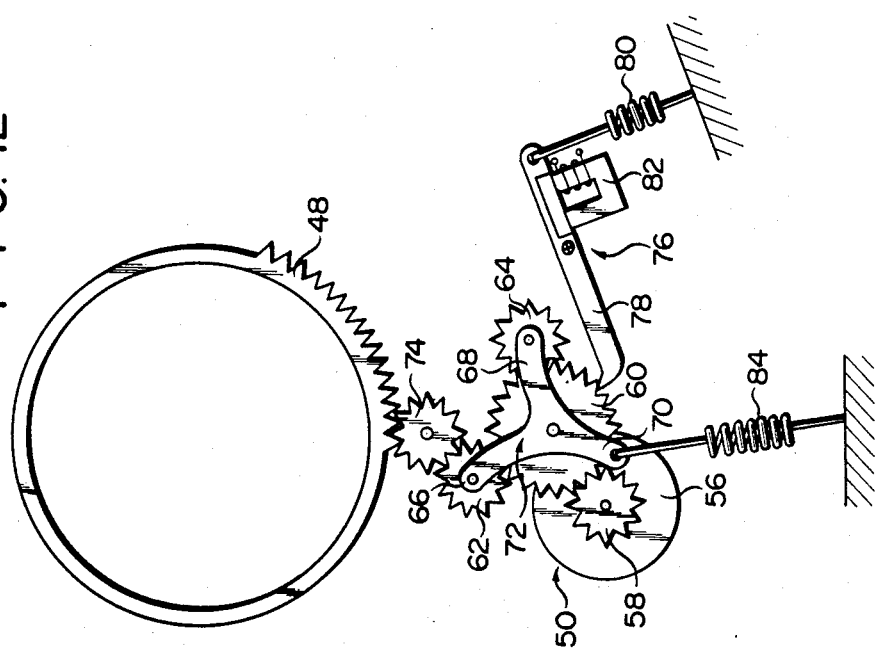

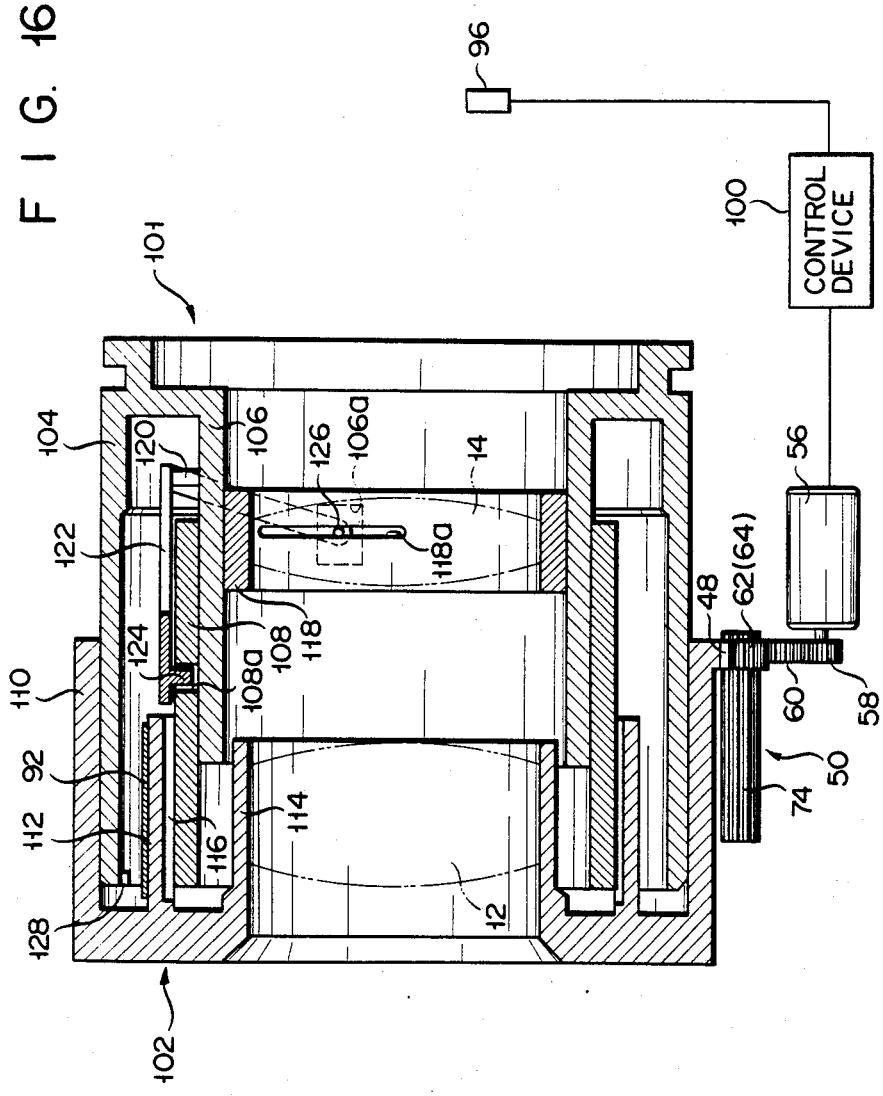

AUTO-FOCUS ZOOM LENS ASSEMBLY

This application is a continuation of application Ser No. 372,698, filed Apr. 28, 1982, now abandoned.

BACKGROUND OF THE INVENTION

This invention relates to a zoom lens assembly having an auto-focus function and more particularly to a zoom lens assembly provided with a ring for at least presetting a distance, driven by a motor and effecting an auto-focus function.

Recently, various kinds of auto-focus cameras have been developed. In the field of a single-lens reflex camera, an exchangeable lens is offered which can effect an auto-focus function. An auto-focus unit utilizing light passing through the lens (abbreviated TTL light) has been developed, wherein a light measuring section of the auto-focus unit detects a position of an image forming plane for a foreground object; and a distance-presetting ring is driven in order to eliminate an error which might arise in the determination of a distance between the image forming plane and a film surface. Development of an auto-focus unit utilizing the TTL light has made it possible to shorten the length of time required to detect the position of the image forming plane and provide a picture whose focus precision is improved.

Moreover, a zoom lens assembly with an auto-focus function has been developed. With this type of a zoom lens unit, light which is reflected from a foreground object, but which has not passed through the zoom lens is measured. In other words, it has been impossible with the zoom lens unit to adopt the method of measuring the TTL light. The reason for this drawback is that it is impossible to resolve problems arising from the effect on the depth of focus according to changes on the focal length caused by the rotation of a zoom ring. Namely, even where the image forming planes produced in telephotography and widephotography are displaced from the film surface by the same distance, a foreground object is actually more remote from the film surface in the widephotography than in the telephotography, in a case where the depth of focus changes.

For instance, when a distance between a foreground object and the film surface varies from the infinite ∞ to 1 m, then the position of the image forming plane is moved about 5.2 mm in a case where the focal length is set at 70 mm, and about 1.3 mm in a case the focal length is set at 35 mm. Where, therefore, the position of the image forming plane has been found to be displaced 1.3 mm from the film surface, then the distance-presetting ring has to be rotated in order to meet a prescribed distance of 1 m, in the case where the focal length is set at 70 mm. In the case where the focal length is set at 35 mm, the distance-presetting ring has to be rotated to meet a prescribed distance of 3.8 m. As described above, a measured distance between the film surface and the image forming plane has to be changed to coincide with the required rotation of the distance-presetting ring to define a prescribed distance, according to a focal length set by the zoom ring. For the reason given above, it has been impossible to adopt the TTL light measuring method for the zoom lens unit.

SUMMARY OF THE INVENTION

An object of the present invention is to overcome the above-mentioned problem and is intended to provide a zoom lens assembly with an auto-focus function which can detect a focus state by applying the TTL light.

According to an aspect of the present invention, there is provided an auto-focus zoom lens assembly which comprises a stationary cylinder fixed to a camera body, a distance-presetting ring which is rotatably fitted coaxially around the cylinder and provided with a first group of lenses to adjust a focus conditon when said ring is rotated, a zoom ring which is rotatably fitted coaxially around the cylinder and set next to the distance-presetting ring in the axial direction and in concentric relationship, the zoom ring being provided with a second group of lenses to control a focal length by being rotated, a drive mechanism for rotating the distance-presetting ring, a detection device which indicates the focused state of a foreground object, and which is supplied with a beam of light reflected from a foreground object through the first and second groups of lenses, a control device for causing the drive mechanism to rotate the distance-presetting ring to adjust the focus in accordance with data represented by a signal issued from the detection device, and instruction means which detects a change in the focal length caused by rotation of the zoom ring and informs the control device of that extent to which the distance-presetting ring is to be rotated in order to maintain a desired focus condition notwithstanding the changed focal length.

BRIEF DESCRIPTION OF THE DRAWINGS

FIG. 1 is an oblique view of one embodiment of a zoom lens assembly with auto-focus function according to this invention;

FIG. 2 is a side view of the zoom lens assembly of FIG. 1;

FIGS. 10 to 14 are front views illustrating the different operations of the drive mechanism;

FIG. 16 is a fractional sectional view schematically showing another embodiment of a zoom lens assembly with an auto-focus function according to this invention;

DETAILED DESCRIPTION OF THE PREFERRED EMBODIMENTS

Figure 3:
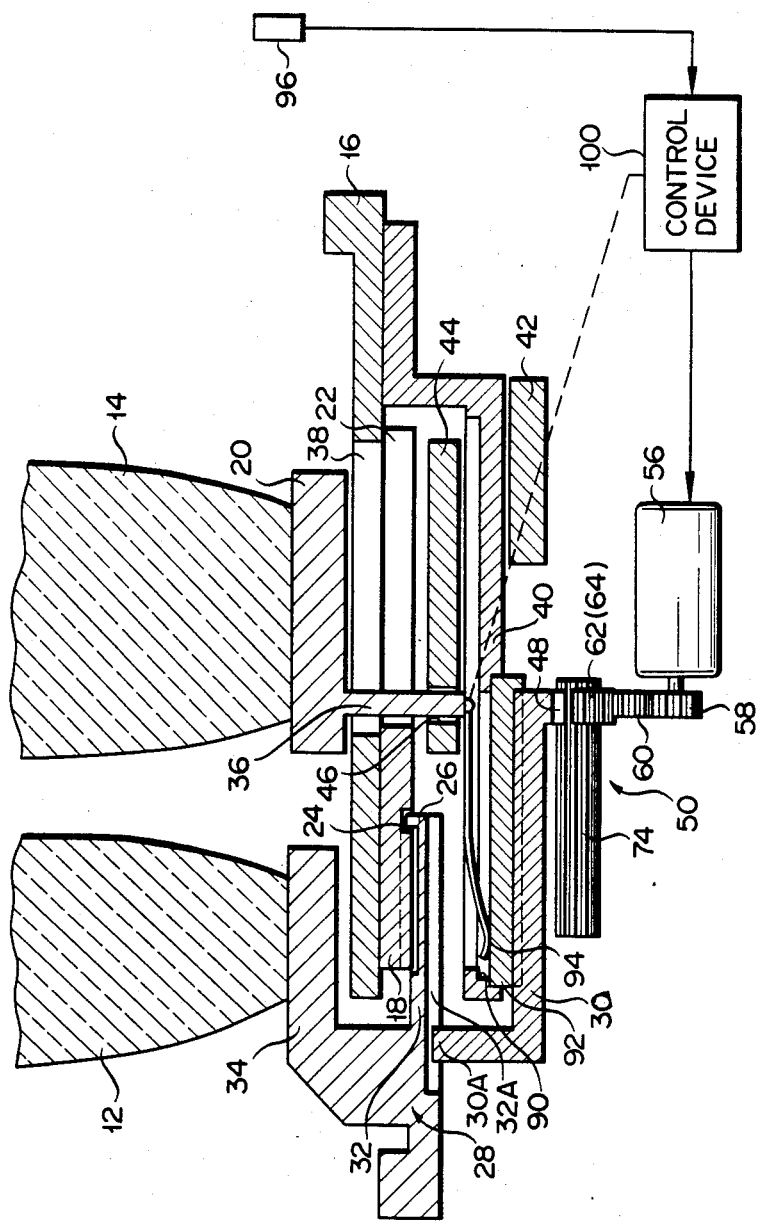
FIG. 3 is an enlarged schematic fractional sectional view of the inner mechanism of the zoom lens assembly of FIG. 1.

Description is now given with reference to FIGS. 1 to 15 of the accompanying drawings of one embodiment of a zoom lens assembly with an auto-focus function according to this invention. FIGS. 1 and 2 indicate a zoom lens assembly 10 with an auto-focus function. The zoom lens assembly 10 is detachably attached to the body of a single-lens reflex camera (not shown), and provided with a zoom mechanism consisting of two groups of lenses, namely, as shown in FIG. 3, a front lens group 12 as a first group of lenses and a rear lens group 14 as a second group of lenses whose optical axes are aligned with each other. The front lens group 12 can control a focus condition by being moved along the optical axis. When moved along the optical axis, the rear lens group 14 can freely define a focal length within a range of, for example, between 35 mm and 70 mm, that is, throughout a range covering telephotography and widephotography.

As shown in FIG. 3, the zoom lens assembly 10 comprises a stationary hollow cylinder 16 arranged to be fixed to a camera body, a front cylinder 18 fitted closely around the outer peripheral wall of the stationary cylinder 16 and movable only along the optical axis of the stationary cylinder 16, and a rear cylinder 20 fitted closely around the inner peripheral wall of the stationary cylinder 16 and movable only along the optical axis of the stationary cylinder 16. The front cylinder 18 is provided with a first cam slit 22 which extends in the direction of the optical axis of the cylinder 18 substantially from the center of the front cylinder 18 to the rear edge thereof and cut throughout the thickness of the front cylinder 18. A helicoid groove 24 is formed in the outer peripheral wall of the front portion of the front cylinder 18. A distance-presetting ring 28 which has a projection 26 radially protruding inward to engage with the helical groove 24 is closely fitted around the outer peripheral wall of the front cylinder 18. The distance-presetting ring 28 is movable in the direction of the optical axis of the front cylinder 18 as well as rotatable about the optical axis. The distance-presetting ring 28 includes an outer cylinder 30 exposed to the outside to act as a driven ring, an intermediate cylinder 32 provided with the projection 26 at the rear end thereof and an inner cylinder 34 whose inner peripheral wall holds the front lens group 12. The outer, intermediate and inner cylinders 30, 32, 34 are concentrically arranged along the optical axis of the front lens group 12. The intermediate cylinder 32 and inner cylinder 34 are integrally formed. However, the outer cylinder 30 is formed separately from the assembly of the intermediate cylinder 32 and inner cylinder 34. An engagement groove 32A extending in the direction of the optical axis is formed on the outer peripheral wall of the intermediate cylinder 32. The front end of the outer cylinder 30 is integrally provided with an inward extending annular strip 30A, whose distal end is engaged with the engagement groove 32A formed in the intermediate cylinder 32. The rotation of the outer cylinder 30 is simultaneously transmitted to the intermediate cylinder 32 and inner cylinder 34. In this case, however, the outer cylinder 30 and the assembly of the integrally formed intermediate cylinder 32 and inner cylinder 34 can be axially moved independently of each other. An engagement pin 36 is integrally formed with the rear cylinder 20 in a portion radially extending outward from the outer peripheral wall of the rear cylinder 20. The engagement pin 36 extends outward through an opening 38 formed in the stationary cylinder 16, and further extends outward. Since the engagement pin 36 is inserted into the first cam slit 22 to engage with the edges of the slit 22, the front cylinder 18 is caused to be movable only in the direction of the optical axis.

An auxiliary cylinder 40 is fixed spatially and concentrically to the outer peripheral wall of the stationary cylinder 16 at the rear end portion of the cylinder 40. The front end of the auxiliary cylinder 40 extends in the proximity of the front end of the stationary cylinder 16. A zoom ring 42 is fitted for rotation around the outer peripheral wall of the rear portion of the auxilliary cylinder 40. The outer peripheral wall of the zoom ring 42 and outer peripheral wall of the outer cylinder 30 are each at the same radial distance from the axis of the cylinder 40. A cam cylinder 44 arranged for movement with the zoom ring 42 is closely fitted to the inner peripheral wall of the rear portion of the auxiliary cylinder 40. A second cam groove 46 is cut throughout the thickness of the cam cylinder 44 so that the groove 16 is inclined at an angle of substantially 45° (FIGS. 4 and 5) to the optical axis. The distal end of the engagement pin is inserted into the second cam groove 46 in a position slightly projecting from the groove 46. When the cam cylinder 44 is rotated with the zoom ring 42, the rear cylinder 20 is moved along the optical axis by the engagement between the second cam groove 46 and engagement pin 36. The rear lens group 14 is then carried along the optical axis by the rear cylinder 20.

The cam cylinder 44 and front cylinder 18 are respectively provided with a cam groove and a pin (both not shown) engageable with each other, for enabling the front cylinder 18 to be moved to a prescribed extent along the optical axis by the rotation of the zoom ring 42. When focusing is carried out by rotating the distance-presetting ring 28 with a focus length initially set at, for example, 35 mm, and later the focal length is continuously varied by rotating the zoom ring 42, then the above-mentioned arrangement enables the desired focusing to be always assured.

Figure 6:
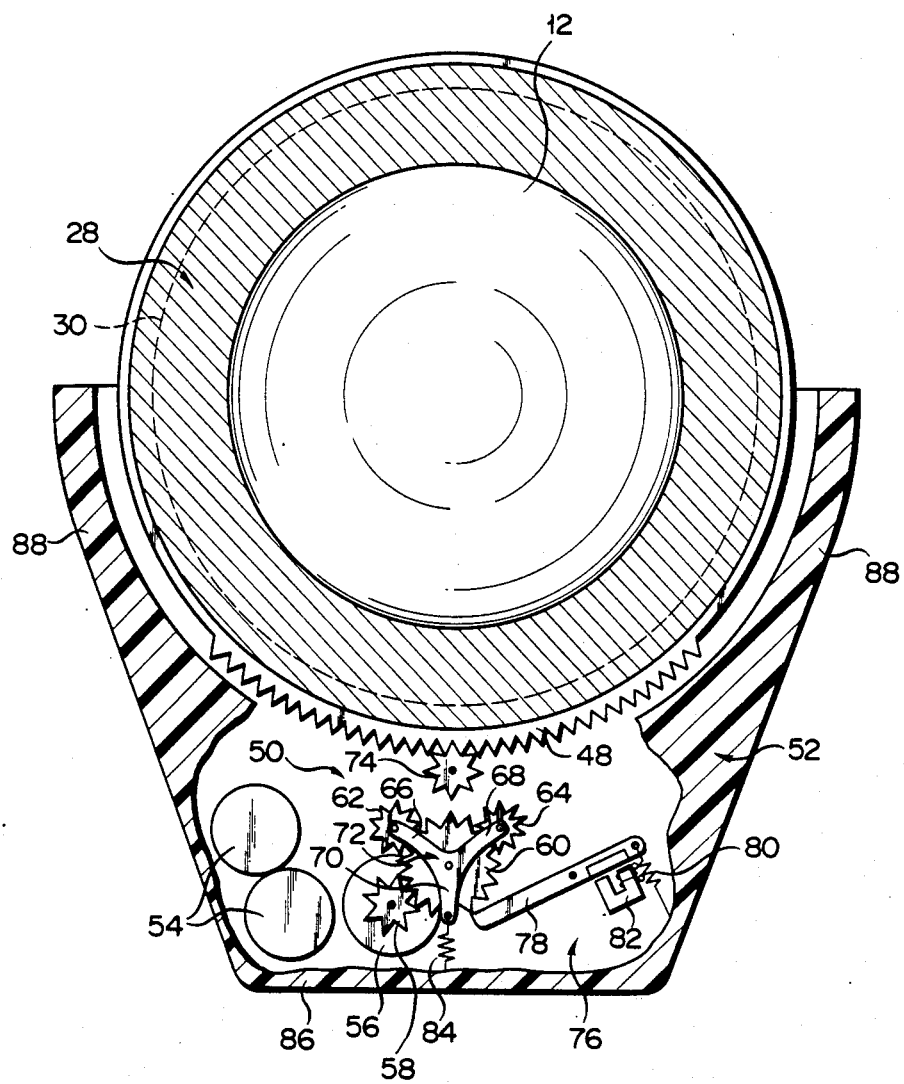
FIG. 6 is a schematic sectional view of an arrangement of a mechanism for rotating a distance-presetting ring.

As shown in FIG. 6, part of the outer periphery of the rear end portion of the outer cylinder 30 of the distance-presetting ring 28 which faces the zoom ring 42 is provided with a driven gear section 48, the circumferential ends of which define an angle of 80° with the center of the distance-presetting ring 28. The driven gear section 48 can swing both ways through a total circumferential angle of 160°. The distance-presetting ring 28 is provided with a drive mechanism 50 which automatically drives the ring 28 by means of the gear section 48.

The drive mechanism 50 is held in a cover 52 fitted to the bottom of the zoom lens assembly 10. The drive mechanism 50 is provided with a motor 56 arranged to be driven by cells 54. A drive gear 58 is concentrically fixed to the drive shaft of the motor 56, in a state always engaged with a sun gear 60. The sun gear 60 is supported for rotation by the cover 52 in a state always engaged with two planet gears 62, 64. A support member 72 rotatable around the rotation axis of the sun gear 60 has three arms 66, 68, 70 which extend equidistantly in three directions. The aforementioned planet gears 62, 64 are respectively supported for rotation by the distal end portions of the first and second arms 66, 68. A transmission gear 74 is provided in a state always engaged with the gear section 48. The transmission gear 74 is rotatably supported by the cover 52, and elongated in the direction of the optical axis, so that even when the distance-presetting ring 28 is moved in the direction of the optical axis, engagement is always maintained between the gear section 48 and transmission gear 74. The transmission gear 74 and planet gears 62, 64 are engageable with each other when the planet gears 62, 64 revolve relative to the sun gear 60 by the action of the motor 56, while being rotated themselves.

A stop mechanism 76 is set near the sun gear 60. The stop mechanism 76 is used to stop the movement of the distance-presetting ring 28 immediately when the motor 56 is stopped by the operation of a control device 100 (shown in FIG. 3). The stop mechanism 76 is provided with a stop lever 78 which is pivoted on the cover 52 in a state rotatable about a substantially central point. One end of the stop lever 78 is made engageable with the teeth of the sun gear 60, and the other end of the stop lever 78 is urged by a first spring 80 in such a direction as causes the one end of the stop lever 78 to be engaged with the sun gear 60. The first spring 80 is chosen to exert a small urging force in order to prevent the rotation of the sun gear 60 by the motor 56 from being obstructed. When, therefore, the sun gear 60 is rotated by the motor 56, the stop lever 78 swings each time one end of the stop lever 78 is engaged with the respective teeth of the sun gear 60.

A solenoid 82 is set near the other end of the stop lever 78. The solenoid 82 urges the stop lever 78 in the same direction as that in which the first spring 80 urges the other end of the stop lever 78. The urging force of the solenoid 82 is chosen to have such a magnitude as to stop the inertial rotation of the sun gear 60 after stoppage of the motor 56. The control device 100 instructs the stoppage of the motor 56 and at the same time, the energization of the solenoid 82 for a prescribed length of time.

A second spring 84 is stretched between the third arm 70 of the support member 72 and the cover 52. The second spring 84 urges the support member 72 to pivot in such a direction as causes the planet gears 62, 64 to be removed from the transmission gear 74. The second spring 84 exerts an urging force which is smaller than the drive force of the motor 56 and yet is sufficiently great to release the planet gears 62, 64 from the transmission gear 74 when the motor 56 is stopped.

As seen from FIGS. 1 and 2, the cover 52 comprises a second section 86 for containing the drive mechanism 50 and covering a limited region at the bottom of the zoom lens assembly 10, and a first section 88 which is formed continuously from the second section 86 to cover fully the region in which the driven gear section 48 is rotated. The first section 88 encloses the driven gear section 48 which lies between the distance-presetting ring 28 and zoom ring 42 and only parts of the distance-presetting ring 28 and zoom ring 42. That portion of the first section 88 of the cover 52 which extends between both circumferentially ends of the first section 88 encloses substantially half the periphery of the zoom lens assembly 10. The driven gear section 48, both ends of which define an angle of 80° with the center of the front lens group 12 can swing through a total angle of 160°. Since half the periphery, that is, the 180° angle region of the first section 88 encloses the driven gear section 48, then the driven gear section 48 is not exposed to the outside even when being rotated.

Returning to FIG. 3, the front portion of the auxiliary cylinder 40 is provided with an opening 90 which opens through the thickness of the auxiliary cylinder 40 and extends in the circumferential direction thereof. A pattern substrate 92 acting as instruction means is fitted into the opening 90. The front and rear end edges of the pattern substrate 92 are defined by the front and rear end edges of the opening 90, so that the movement of the pattern substrates 92 along the optical axis direction is prevented. However, the rotation of the pattern substrate 92 about the optical axis is enabled with the surfaces of the front and rear end portions of the pattern substrate 92 in slideable contact with those of the opening 90. The outer peripheral wall of the pattern substrate 92 is engaged with the inner peripheral wall of the outer cylinder 30 of the distance-presetting ring 28 by means of grooves formed in both members 92, 30 and extending along the direction of the optical axis. Therefore, the movement of the distance-presetting ring 28 along the optical axis direction is not transmitted to the pattern substrate 92, but the rotation of the distance-presetting ring 28 is transmitted to the pattern substrate 92. As a result, the pattern substrate 92 is rotated with the distance-presetting ring 28.

Figure 4:
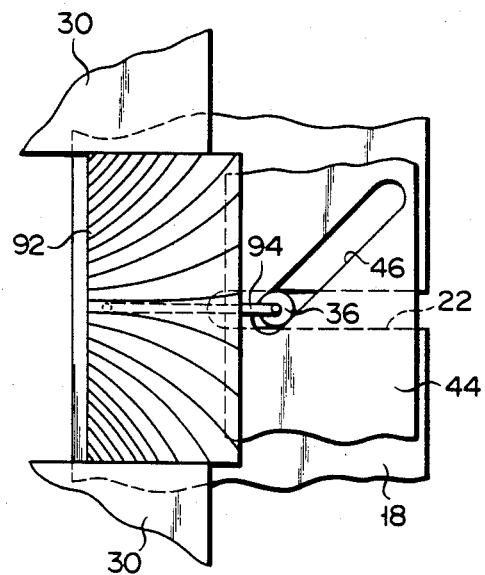
FIG. 4 is a top plan view showing one operated position of a contact relative to a pattern substrate.
Figure 5:
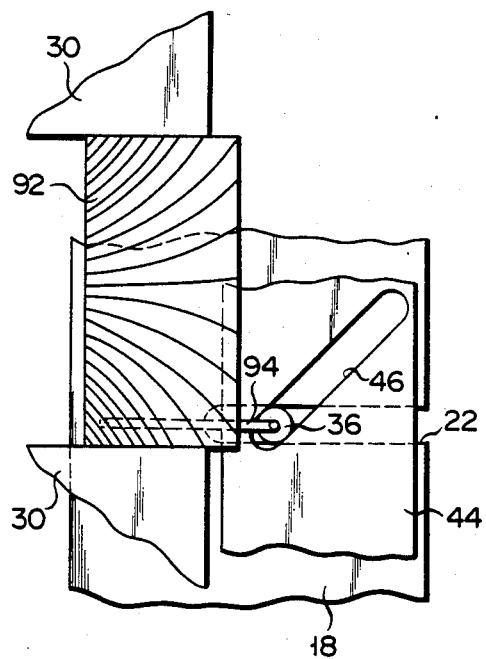
FIG. 5 is a top view indicating a different operated position of the contact from that of FIG. 4.

As seen from FIGS. 4 and 5, a large number of patterns are formed on the inner peripheral wall of the pattern substrate 92. The rear end of a contact 94 is fixed to the distal end of the engagement pin 36. The front end of the contact 94 touches the inner peripheral wall of the pattern substrate 92. The position in which the contact 94 touches the inner peripheral wall of the pattern substrate 92 varies with the extent to which the distance-presetting ring 28 and zoom ring 42 are rotated.

Figure 8:
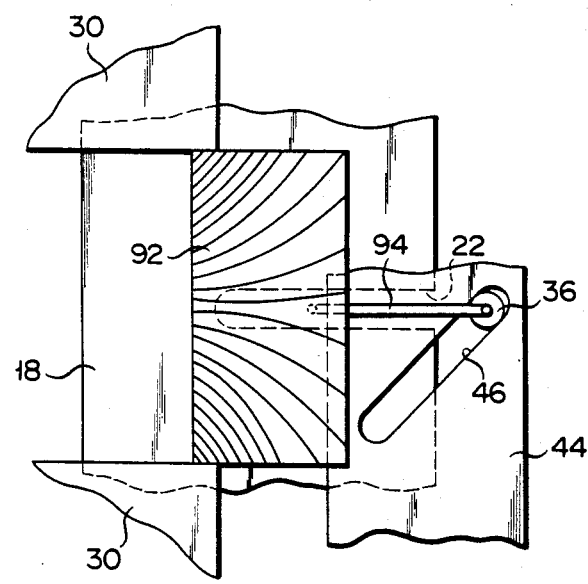
FIGS. 8 and 9 indicate different operated conditions of the contact relative to the pattern substrate from those of FIGS. 4 and 5.
Figure 9:
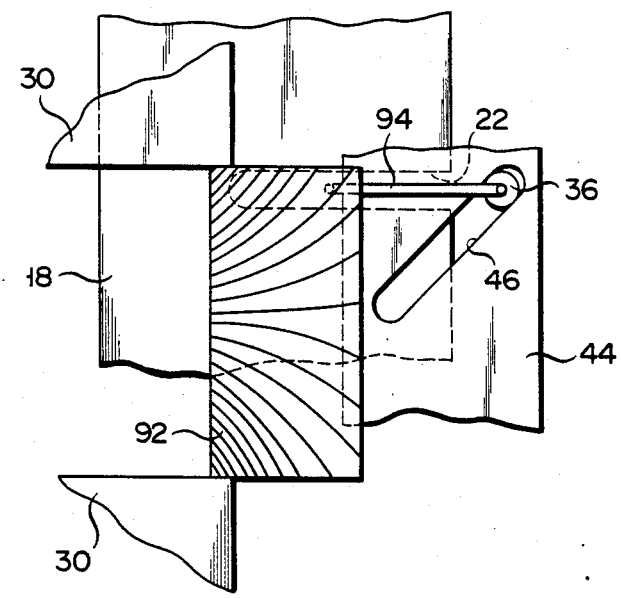
Figure 15:
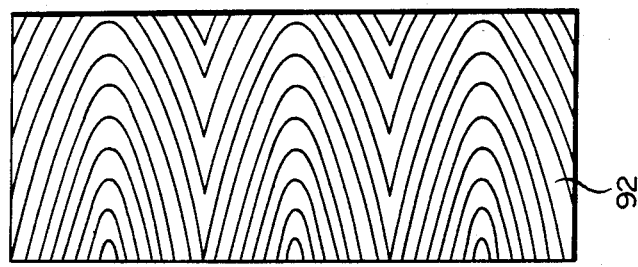
FIG. 15 is a top view showing a modification of the pattern substrate.

When the zoom ring 42 is rotated to provide a focal length of 70 mm as shown in FIG. 3, causing the rear cylinder 20 to be pushed forward, and further the pattern substrate 92 is rotated to an extent corresponding to the full rotation of the distance-presetting ring 28, then the number of the patterns which can be crossed by the contact 94 (as shown in FIGS. 4 and 5) is chosen to be 52. When the zoom ring 42 is rotated to provide a focal length of 50 mm, causing the rear cylinder 20 to be pushed backward to an extent corresponding to about half the prescribed axial movement of the rear cylinder 20, and further the pattern substrate 92 is rotated to an extent corresponding to the full rotation of the distance-presetting ring 28, then the number of the patterns which can be crossed by the tip of the contact 94 is set at 26. When the zoom ring 42 is rotated to provide a focal length of 35 mm as shown in FIG. 7, causing the rear cylinder 20 to be retracted, and further the pattern substrate 92 is rotated to an extent corresponding to the full rotation of the distance-presetting ring 28, then the number of the patterns which can be crossed by the tip of the contact 94 (as shown in FIGS. 8 and 9) is prescribed to be 13.

In other words, when a focal length is set at 70 mm, then the focal point should be shifted through a distance of 5.2 mm, namely, an extent corresponding to a preset distance from the film surface to a foreground object, for example, from ∞ to 1 m. This shift distance of 5.2 mm is divided in 52 equal parts. When the focal length is set at 50 mm, then the focal point should be shifted through a distance of 2.6 mm. This shift distance of 2.6 mm is divided in 26 equal parts. When the focal point is set at 35 mm, then the focal point should be shifted through a distance of 1.3 mm. This shift distance is divided in 13 equal parts. When, therefore the focal length is set at 70 mm, and the position of the image forming plane is displaced from the film surface to an extent of an n multiple of the 0.1 mm unit, then the distance-presetting ring 28 should be further rotated from its initial rotational position after the focal length of 70 mm is preset to such extent that an n number of patterns can be crossed by the tip of the contact 94. The above-mentioned rotation of the distance-presetting ring 28 causes the position of the image forming plane to be shifted to an extent of [0.1×n] mm to be in exact alignment with the film surface.

Figure 7:
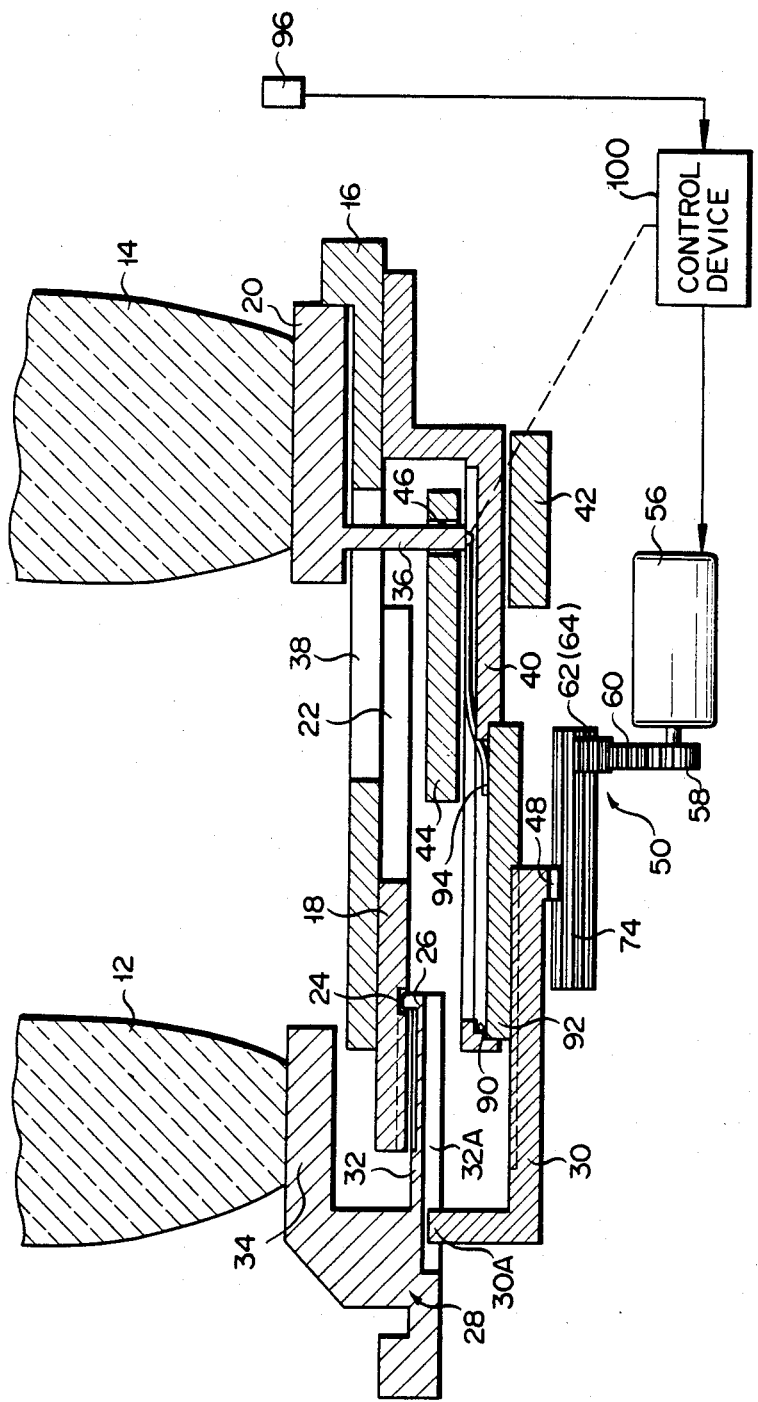
FIG. 7 is a fractional sectional view of a different operated state of the zoom lens assembly from that of FIG. 3.

Referring to FIGS. 3 and 7, a light-receiving focus detection element 96 (hereinafter referred to as a "light-receiving element") is provided behind the rear group of lenses 14 and ahead of the film in a position capable of receiving part of the light beams emitted from a foreground object through the lenses 12 and 14. The light-receiving element 96 detects the extent of the displacement of the position of the image forming plane from the film surface by means of the light beams sent forth from the foreground object, and transmits the result of the detection to the control device 100.

As shown in FIGS. 1 and 2, the first section 88 of the cover 52 is provided with a switch 98 for an auto-focus function. When the switch 98 remains nonconducting, then the distance-presetting ring 28 is manually operated. When the switch 98 is rendered conducting, then the distance-preseting ring 28 is automatically driven by means of the drive mechanism 50 in accordance with a signal representing the result of focus detection which is supplied from the light-receiving element 96 while being controlled by the control device 100.

The operation of the zoom lens assembly 10 arranged as described above will now be described. When the switch 98 is rendered nonconducting and the distance-presetting ring 28 is manually operated, then the motor 56 is not engaged with the driven gear section 48 (FIG. 10). In this case, the distance-presetting ring 28 can be smoothly rotated by hand. The cover 52 does not fully enclose half the peripheral portion of the bottom of the zoom lens assembly 10. But as shown in FIGS. 1 and 2, the second section 86 holding the drive mechanism 50 covers a limited region of the bottom of the zoom lens assembly 10, and only the first section 88 of the cover 52 which encloses the driven gear section 48 also covers half the periphery of the bottom of the zoom lens assembly 10. Therefore, when the distance-presetting ring 28 or zoom ring 42 is manually operated, the cover 52 does not obstruct the manual operation. Since the first section 88 of the cover 52 encloses the whole rotatable range of the driven gear section 48, the possibility is eliminated that the tips of the teeth of the driven gear section 48 may touch the operator's fingers, thereby obstructing the above-mentioned manual rotation of the distance-presetting ring 28 or zoom ring 42 or injuring the operator's fingers. Therefore, good focusing is always assured.

When the switch 98 is rendered conducting for automatic focusing, part of light beams reflected from a foreground object always enter the light-receiving element 96 for detection of focus through the front and rear groups of lenses 12, 14. Therefore, focus is detected the moment the switch 98 is rendered conducting. Now let it be assumed that as shown in FIGS. 3 and 4, the zoom ring 42 is rotated to set a focal length at 70 mm. When, under this condition, the light-receiving element 96 detects that the position of the image forming plane is displaced, for example, 0.9 mm from the film surface toward the zoom lens assembly 10, then the control device 100 carries out the operation of causing the motor 56 to be driven in one direction in order to let the distance-presetting ring 28 be rotated from the above-mentioned displaced position as shown in FIG. 5, until the tip of the contact 94 traverses nine patterns; stopping the motor 56 when the nine patterns are traversed by the tip of the contact 94; and actuating the stop mechanism 76 to stop the rotation of the distance-presetting ring 28. The above-mentioned rotation of the distance-presetting ring 28 causes the position of the image forming plane to be retracted for alignment with the film surface.

Now let it be assumed that as shown in FIGS. 7 and 8, the zoom ring 42 is rotated to set the focal length at 35 mm. When, under this condition, the light-receiving element 96 detects that the position of the image forming plane is displaced, for example, 0.4 mm backward of the film surface, then the control device 100 carries out the operation of causing the motor 56 to be driven in the opposite direction in order to let the distance-presetting ring 28 be rotated from the displaced position as shown in FIG. 9, until the tip of the contact 94 traverses four patterns; stopping the motor 56 when the four patterns are traversed by the tip of the contact 94; and actuating the stop mechanism 76 to stop the rotation of the distance-presetting ring 28. The above-mentioned rotation of the distance-presetting ring 28 to compensate for the aforesaid displacement causes the position of the image forming plane to be shifted 0.4 mm toward the zoom lens assembly 10, for alignment with the film surface.

A description is now given, with reference to FIGS. 10 to 14 of the operation of the drive mechanism 50.

As shown in FIG. 10, when the switch 98 is rendered conducting, then the control device 100 causes the motor 56 to be rotated counterclockwise in FIG. 10 in accordance with the contents of a signal representing the detection of the state of focus. This rotation of the motor 56 causes the sun gear 60 engaged with the drive gear 58 of the motor 56 to be rotated clockwise. As a result, the first planet gear 62 revolves around the sun gear 60 clockwise, while being rotated counterclockwise on its axis, by means of the action of the three-armed support member 72. During the above-mentioned revolution around the sun gear 60, the first planet gear 62 is brought into engagement with the transmission gear 74 as illustrated in FIG. 11 against the urging force of the second spring 84 and then ceases to revolve about the sun gear 60. Since, in this case, the first planet gear 62 continues to be rotated, the transmission gear 74 is rotated clockwise. As a result, the driven gear section 48 is rotated counterclockwise. This rotation is continued, until a prescribed number of patterns are traversed by the tip of the contact 94. When it is detected that the prescribed number of patterns have been traversed by the tip of the contact 94, then the control device 100 stops the motor 56 and actuates the stop mechanism 76 as shown in FIG. 12. That is, the solenoid 82 is energized to rock the stop lever 78 in such a manner that the one end of the stop lever 78 is pressed against the sun gear 60. As a result, the sun gear 60 does not continue rotation by inertia, but ceases to be rotated the moment the motor 56 stops, thus causing the driven gear section 48 to cease its rotation.

The solenoid 82 continues to be energized, until the action of a shutter release is brought to an end, and later is deenergized. This deenergization disengages the stop lever 78 from the sun gear 60. The three-armed support member 72 is brought back to a neutral position (FIG. 10) by the urging force of the second spring 84, causing the first planet gear 62 to be released from the transmission gear 74.

Figure 14:
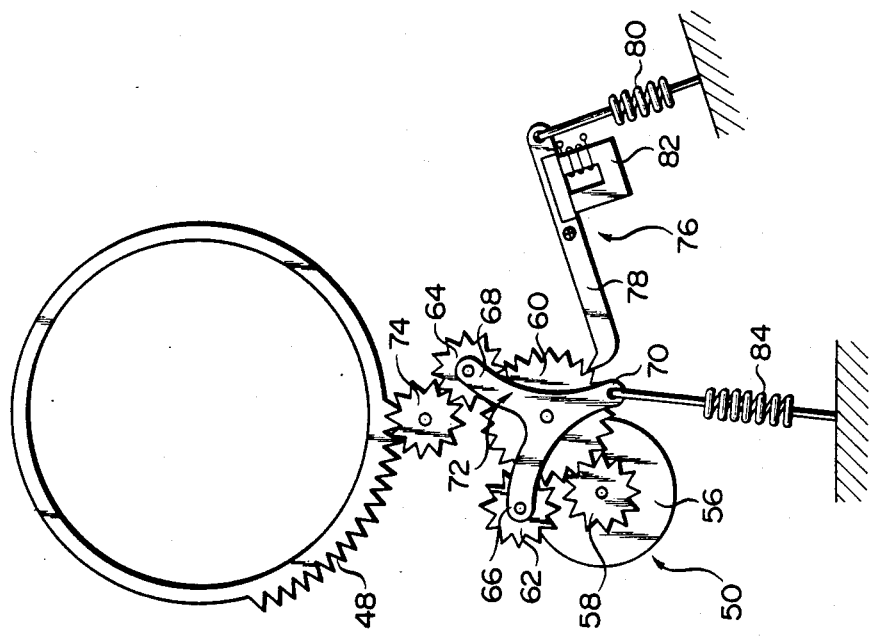

When the control device 100 causes the motor 56 to be rotated clockwise in FIG. 10, then the sun gear 60 engaged with the drive gear 58 of the motor 56, is rotated counterclockwise. Accordingly, the second planet gear 64 revolves counterclockwise around the sun gear 60, while being rotated clockwise on its axis. During the counterclockwise revolution, the second planet gear 64 is engaged with the transmission gear 74 as shown in FIG. 13 and ceases its revolution around the sun gear 60. In this case, the second planet gear 64 continues its rotation, causing the transmission gear 74 to be rotated counterclockwise. As a result, the driven gear section 48 is rotated clockwise. Later the driven gear section 48 is brought to reset as shown in FIG. 14, and later the support member 72 regains a neutral position shown in FIG. 10.

This invention is not limited to the above-mentioned embodiment, but is applicable in various modifications without departing from the object of the invention. For instance, the pattern appearing on the pattern substrate 92 need not have the shape illustrated in FIG. 4. Namely, the patterns may have the shape as shown as one modification in FIG. 15. The main point is that patterns should be provided in such a number as corresponds to a prescribed focal length. With the foregoing embodiment, the focal length was varied within the range of 35 to 70 mm. However, these values are given simply as examples. Obviously, the focal length may be preset at any other value. Further, the patterns need not be provided in the number given in the foregoing embodiment. The point is that the patterns be provided in such a number as corresponds to a prescribed depth of focus.

The material constituting the pattern on the substrate 92 and the tip of the contact 94 may be combined in any form, provided the number of patterns can be distinctly recognized by the control device 100. For instance, it is possible to combine a conductive metal strip and electric contact, or a light-reflecting metal strip and photo-coupler.

Both ends of the driven gear section 48 may define any other angle than the previously described 80° with the center of the front lens group 12. The first section 88 of the cover 52 well serves the purpose, provided it encloses the driven gear section 48 over a range larger than twice the aforementioned angle.

With the foregoing embodiment, the distance-presetting ring is rotated to an extent corresponding to a change in the focal length caused by the rotation of the zoom ring. Therefore, the distance-presetting ring can be rotated to an extent corresponding to the displacement between the position of the image forming plane from the film surface determined by the light-receiving element 96 for focus-detecting, according to the preset focal length. In other words, this invention provides a focus-detecting system based on the measurement of the TTL light instead of the measurement of any light after than the TTL light, which system is well adapted to be used in an auto-focus mechanism for a zoom lens assembly.

Further with the foregoing embodiment, the motor and distance-presetting ring are connected together only when the motor is driven during the auto-focus operation, causing the driving force of the motor to be transmitted to the distance-presetting ring. At any other time, the motor and distance-presetting ring are not engaged with each other. Under such condition, the distance-presetting ring can be manually rotated with a light force without being affected by the motor. Further, a changeover between the automatic and manual focusing operations can be freely effected in good timing.

With the foregoing embodiment, a mechanism for driving the distance-presetting ring comprises a motor, two planet gears always engaged with a sun gear driven by the motor, a three-armed support member rotatably holding two planet gears, a driven gear section formed in part of the peripheral wall of the distance-presetting ring, a transmission gear always engaged with the driven gear section and set between the two planet gears to be selectively engaged with one of them, and a spring for urging the three-armed support member in such a direction as causes the two planet gears to be removed from engagement with the transmission gear.

When the motor is driven, one of the two planet gears is selectively engaged with the transmission gear to transmit the drive force of the motor to the driven gear section. When the motor is not driven, both planet gears are released from the transmission gear by the urging force of the spring. Thus, this invention provides a mechanism for driving a distance-presetting ring of an auto-focus lens assembly, which facilitates manual focusing by preventing the distance-presetting ring from being engaged with the motor, and effects automatic focusing by causing the drive force of the motor to be immediately transmitted to the distance-presetting ring.

Further, the foregoing embodiment of the auto-focus zoom lens assembly comprises a distance-presetting ring rotated to control a position of an image forming plane, a zoom ring set adjacent to the distance-presetting ring and rotated to control a focal length, a driven gear section formed in part of the bottom peripheral wall of the distance-presetting ring, a motor provided with a gear engageable with the driven gear section, and a cover including a first section which encloses the range through which the driven gear section swings and a second section which is formed contiguous to the first section and encloses the bottoms of the zoom ring and distance-presetting ring and in which the motor is set.

Therefore, according to this one embodiment, an auto-focus zoom lens assembly enables the whole swing range of the driven gear section to be covered and facilitates the manual rotation of the distance-presetting ring and the control of the position of the image forming plane.

In the foregoing embodiment, the position of the image forming plane is controlled by rotating the distance-presetting ring 28 and the focal length is adjusted by turning the zoom ring 42. The invention is not limited to this embodiment.

Now referring to FIGS. 16 to 22, another embodiment of the present invention will be described. In FIGS. 16 to 22 and in the following description, like or the same numerals are used to denote like or the same members as used in the above-described embodiment, and such members will not be described.

As shown in FIG. 16, the second embodiment is a zoom lens assembly 101 having a single operation ring 102 which is turned and moved thereby to achieve controlling the position of the image forming plane and controlling focal length, respectively. The zoom lens assembly further has a hollow stationary cylinder 104. The cylinder 104 is fixed to a camera body when the lens assembly 101 is attached to the camera body. In the cylinder 104 an auxiliary cylinder 106 is coaxially fixed thereto. On the outer periphery of the auxiliary cylinder 106 a cam cylinder 108 is closely slidably mounted. The cam cylinder 108 can slide along the direction of the optical axis of the lens assembly 101.

The operation ring 102 is slidably mounted on the outer periphery of the cylinder 104 along the optical axis direction and can rotate about the optical axis of the lens assembly 101. The ring 102 comprises an outer cylinder 110, an intermediate cylinder 112 and a first holding cylinder 114, all arranged coaxially. The outer cylinder 110 is closely fitted on the outer periphery of the distal end portion of the cylinder 104. The intermediate cylinder 112 is closely fitted on the outer periphery of the distal end portion of the cam cylinder 106. The first holding cylinder 114 holds the front lens group 12.

The cam cylinder 108 is helicoid-connected to the intermediate cylinder 112 through a helicoid section 116. On the inner periphery of the auxiliary cylinder 106 a second holding cylinder 118 holding the group of rear lenses 14 is slidably mounted and can move along the direction of the optical axis of the lens assembly 101.

Figure 17:
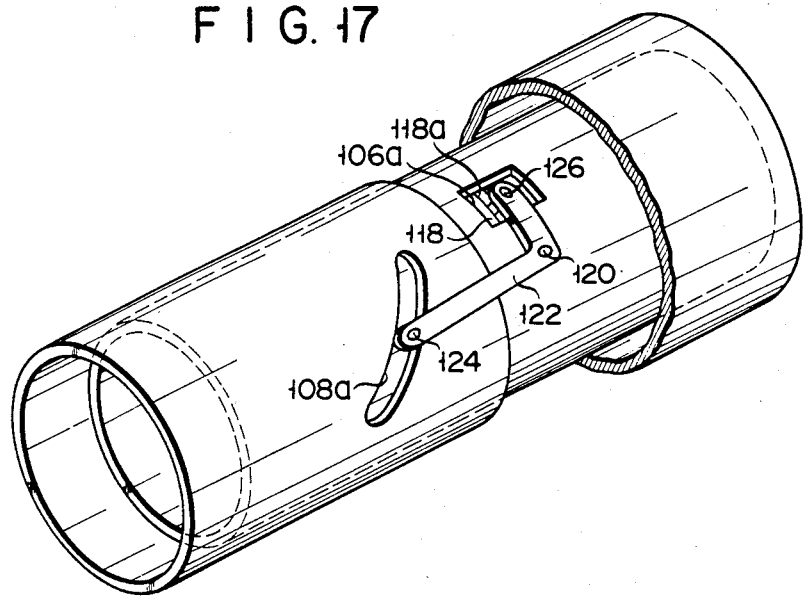
FIG. 17 is an oblique view partially broken away of the zoom lens assembly shown in FIG. 16.

As shown in FIG. 17, a cam groove 108a is cut in the outer periphery of the cam cylinder 108. The cam groove 108a extends slantwise to the optical axis of the lens assembly 101. A through hole 106a is made in the auxiliary cylinder 106. To the outer periphery of the auxiliary cylinder 106 an L-shaped level 122 is pivotally mounted by a pin 120 at the bending portion of the lever 122. One end portion of the lever 122 has a first engaging pin 124 fixed thereto. The pin 124 is received in the cam groove 108a. The other end of the lever 122 has a second engaging pin 126 fixed thereto. The pin 126 extends through the hole 106a of the auxiliary cylinder 106, and its tip is received in an annular groove 118a cut in the outer periphery of the second holding cylinder 118. The through hole 106a is larger than the pin 124 is thick, so that the lever 122 and thus its other end may move freely.

Figure 18:
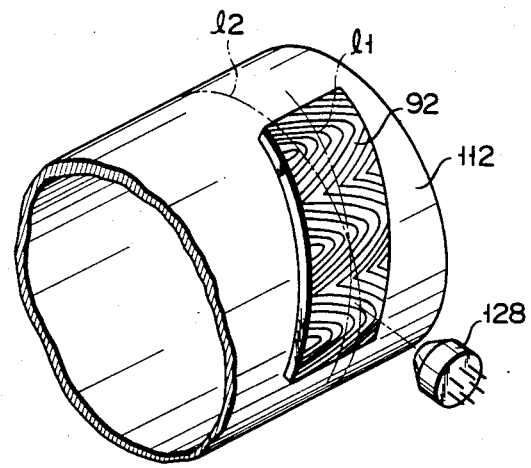
FIG. 18 is an oblique view partially broken away of an intermediate cylinder with a pattern substrate.

On the outer periphery of the intermediate cylinder 112 the pattern substrate 92 is laid. As shown in FIG. 18, the substrate 92 is positioned with its longitudinal aixs l1 extending a little slantwise to the circumferential direction l2 of the intermediate cylinder 112. On that portion of the inner periphery of the cylinder 104, which faces the pattern substrate 92, there is provided a photo-coupler 128 for counting the patterns printed on the substrate 92. On the bottom of the operation ring 102 the driven gear section 48 is provided.

Figure 19:
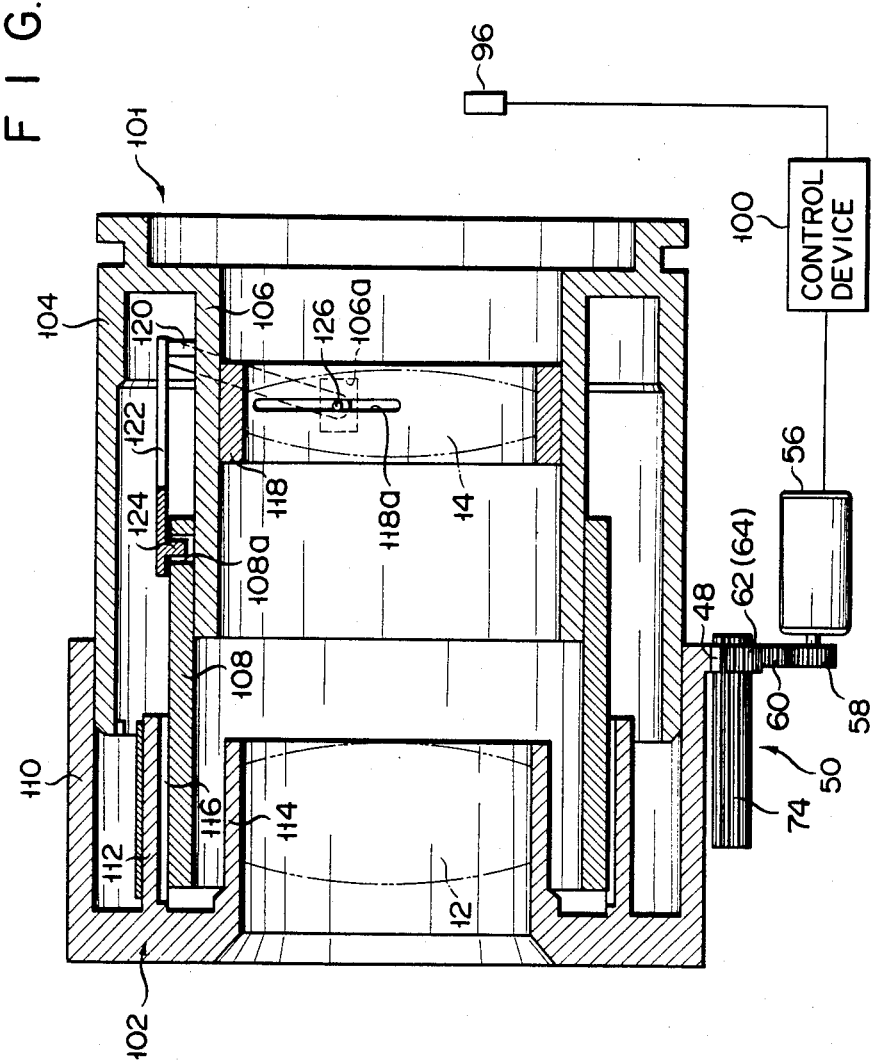
FIG. 19 is a fractional sectional view of a different operated state of the zoom lens assembly from that of FIG. 16.
Figure 20:
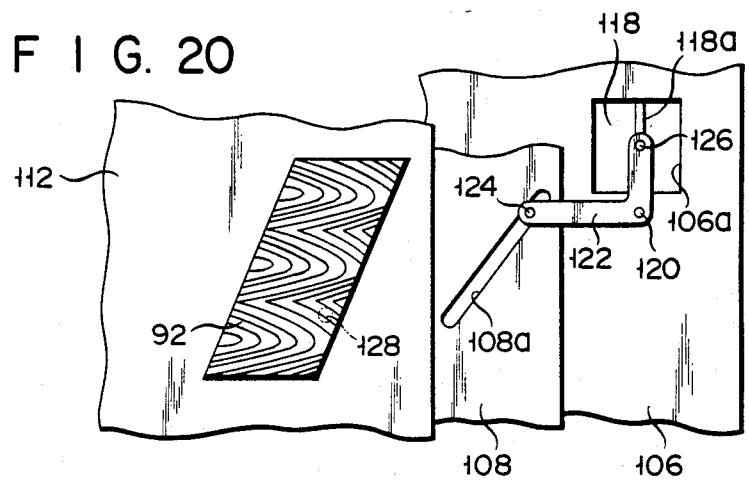
FIG. 20 is a top view showing one operated position of a photo-coupler relative to the pattern substrate.

In order to adjust the position of the image forming plane, the operation ring 102 is rotated, but not moved along the optical axis direction of the lens assembly 101. The motor 56 is used to rotate the ring 102. (The ring 102 may also be rotated by hand.) As the ring 102 is rotated, the cam cylinder 108 does not rotate relative to the cylinder 104. As a result, the front lens group 12 is moved toward an object through the helicoid section 116. As the ring 102 is rotated, the pattern substrate 92 moves as shown in FIGS. 19 and 20. The photo-coupler 128, which is fixed at its position, moves relative to the pattern substrate 92 and counts the patterns. When the photo-coupler 128 counts the number of patterns which it must scan to coincide the point of the image forming plane with the film surface, the control device 100 stops the motor 56. This is how the focusing is automatically adjusted.

Figure 21:
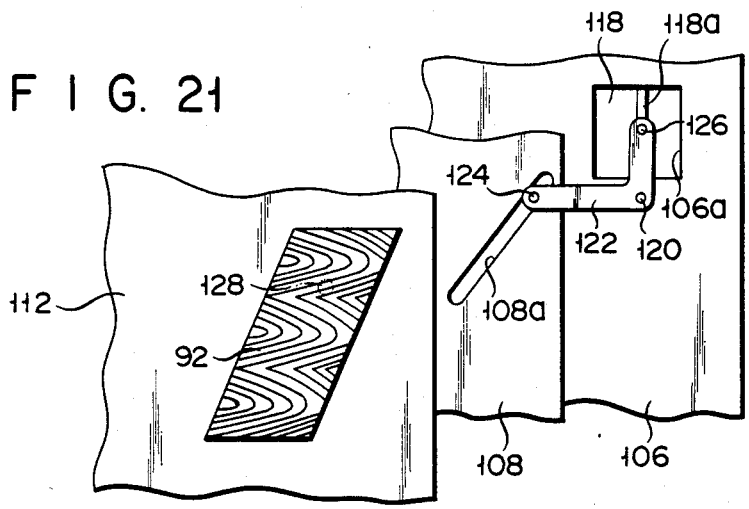
FIGS. 21 and 22 are top views showing the different operated conditions of the photo-coupler relative to the pattern substrate from those of FIG. 20.
Figure 22:
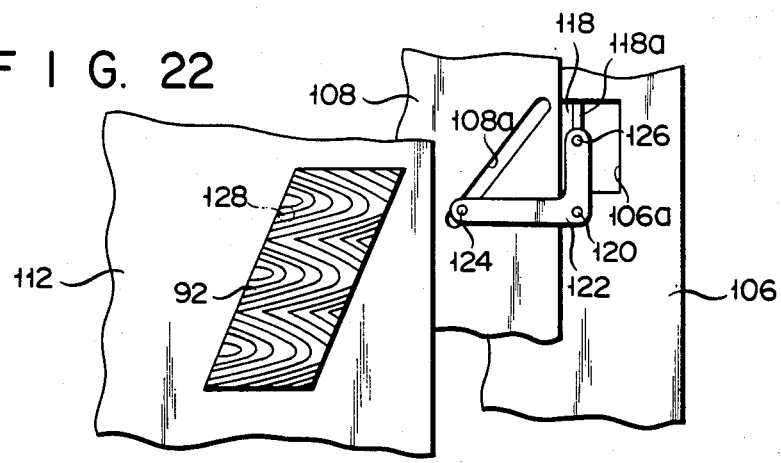

In order to vary the focal length, the operation ring 102 is moved along the optical axis direction of the lens assembly 101, but not rotated about the optical axis. As the ring 102 is moved in this manner, the front lens group 12 moves along the optical axis direction of the lens assembly 101. At the same time, the lever 122 is rocked about the pin 120 because the first engaging pin 124 is received in the cam groove 108a as shown in FIGS. 21 and 22. As a result, the rear lens group 14 is moved for a prescribed distance along the optical axis direction of the lens assembly 101. Consequently, the focal length is changed as illustrated in FIGS. 21 and 22.

What we claim is:

1. A zoom lens assembly with an auto-focus function, comprising:

a stationary hollow cylinder arranged to be fixed to a camera body, said cylinder having an optical axis;

a distance-presetting ring which is fitted for rotation around the circumference of said cylinder and provided with a first group of lenses to adjust a focus condition of the image of a foreground object at a film surface in the camera body by being rotated;

a zoom ring which is fitted for rotation around the circumference of said cylinder and set next to the distance-presetting ring in the axis direction and in concentric relationship, said zoom ring being provided with a second group of lenses to control a focal length by being rotated;

drive means arranged at the outer periphery of the distance-presetting ring for rotating said distance-presetting ring about said optical axis;

detection means arranged in the vicinity of the film surface for indicating the focused state of the image of the foreground object at the film surface, said detection means being supplied with a beam of light reflected from the foreground object through said first and second groups of lenses and including a light-receiving element arranged to detect a direction and amount of displacement between a position of an image forming plane for the foreground object and the film surface, said light-receiving element being operative to supply a detection signal representing said direction and said amount of displacement;

control means coupled to the detection means for causing the drive means to rotate the distance-presetting ring to adjust the focus condition at the film surface in accordance with the detection signal supplied from the detection means; and instruction means associated with said distance-presetting ring and said zoom ring for detecting a change in the focal length caused by the rotation of the zoom ring and for supplying to said control means information relating to that extent to which said distance-presetting ring is to be rotated to maintain the focus condition of the image of the foreground object at the film surface notwithstanding the changed focal length.

2. The zoom lens assembly according to claim 1, wherein the instruction means comprises a substrate and a plurality of patterns indicated on the substrate; the substrate is set in a ifxed position along the optical axis direction of the stationary cylinder and is arranged to be rotated with the distance-presetting ring relative to said stationary cylinder; the zoom ring is provided with detector contact means which is rotated and moved along the optical axis direction of the stationary cylinder with the zoom ring to define a prescribed focal length, said detector contact means being movable with respect to the patterns on the substrate for counting said plurality of patterns, wherein the number of individual patterns which are counted by the detector contact means when the distance-presetting ring is rotated through a full range is chosen to be that which corresponds to the extent to which the position of the image forming plane is shifted relative to an infinite distance of the foreground object for respective focal lengths.

3. The zoom lens assembly according to claim 1, wherein the drive means comprises:
a motor;
a sun gear arranged to be rotated by the motor;
two planet gears arranged to be always engaged with the sun gear;
a three-armed support member for rotatably supporting said two planet gears on two corresponding arms of said support member and for defining a path of movement for said two planet gears;
a driven gear section formed in part of the peripheral wall of the distance-presetting ring;
a transmission gear arranged to be always engaged with said driven gear section and set medially along the path of movement of said two planet gears to be selectively engaged with either one of said two planet gears; and
a spring coupled to the third arm of the three-armed support member for urging the three-armed support member in such a direction as causes the two planet gears to be released from engagement with the transmission gear,
and wherein, when the motor is driven, one of said two planet gears is selectively engaged with the transmission gear, for causing the drive force of the motor to be transmitted to the drive gear section, and, when the motor is not driven, the two planet gears are urged by the spring to be disengaged from the transmission gear.

4. The zoom lens assembly according to claim 2, wherein the control means operates to determine the direction in which the distance-presetting ring is to be rotated in accordance with data on the direction of the displacement of the position of the image forming plane from the film surface which data are furnished by the detection signal sent from the light-receiving element, and to cause the distance-presetting ring to be rotated to such extent that the detector contact means counts that number of patterns which corresponds to the displacement between the position of the image forming plane and the film surface, for the respective focal lengths.

5. The zoom lens assembly according to claim 3, wherein the driven gear section is formed in that part of the bottom peripheral wall of the distance-presetting ring which lies between the zoom ring and distance-presetting ring.

6. The zoom lens assembly according to claim 5, which further comprises a cover which is fixed with respect to the stationary hollow cylinder and includes a first section for enclosing the driven gear section over its range of rotational movement, and a second section which is formed contiguous to the first section to enclose the bottoms of the zoom ring and distance-presetting ring wherein the motor is mounted within said second section of the cover.

7. A zoom lens assembly with an auto-focus function, comprising:

a stationary hollow cylinder arranged to be fixed to a camera body, said cylinder having an optical axis;
an operation ring which is fitted for rotation and axial movement around and along the circumference of said cylinder and provided with a first group of lenses to adjust a focus condition of the image of a foreground object at a film surface in the camera body by being rotated, and a second group of lenses to control a focal length by being moved in the optical axis direction;
drive means arranged at the outer periphery of the operation ring for rotating said operation ring;
detection means arranged in the vicinity of the film surface for indicating the focused state of the image of the foreground object at the film surface, said detection means being supplied with a beam of light reflected from the foreground object through said first and second groups of lenses and including a light receiving element arranged to detect a direction and amount of displacement between a position of an image forming plane for the foreground object and the film surface, said light receiving element being operative to supply a detection signal representing said direction and said amount of displacement;
control means coupled to the detection means for causing the drive means to rotate the operation ring to adjust the focus condition of the film surface in accordance with the detection signal supplied from the detection means; and
instruction means associated with said operation ring for detecting a change in the focal length caused by the movement of the operation ring and for supplying to said control means information relating to that extent to which said operation ring is to be rotated to maintain the focus condition of the image of the foreground object at the film surface notwithstanding the changed focal length.

8. The zoom lens assembly according to claim 7, wherein the instruction means comprises a substrate and a plurality of patterns indicated on the surface of the substrate; the substrate is set in a fixed position along the optical direction of the stationary cylinder and is arranged to be rotated with the operating ring relative to said stationary cylinder; the stationary cylinder is provided with detector contact means which is relatively rotated and moved along the optical axis direction of the stationary cylinder with the operation ring to define a prescribed focal length, said detector contact means being movable with respect to the patterns on the substrate for counting said plurality of patterns, wherein the number of individual patterns which are counted by the detector contact means when the operation ring is rotated through a full range is chosen to be that which corresponds to the extent to which the position of the image forming plane is shifted relative to an infinite distance of the foreground object for respective focal lengths.

9. The zoom lens assembly according to claim 7, wherein the drive means comprises:
a motor;
a sun gear arranged to be rotated by the motor;
two planet gears arranged to be always engaged with the sun gear;
a three-armed member for rotatably supporting said two planet gears on two corresponding arms of said support member and for defining a path of movement for said two planet gears;

a driven gear section formed in part of the peripheral wall of the operation ring;

a transmission gear arranged to be always engaged with said driven gear section and set medially along the path of movement of said two planet gears to be selectively engaged with either one of said two planet gears; and a spring coupled to the third arm of the three-armed support member for urging the three-armed support member in such a direction as causes the two planet gears to be released from engagement with the transmission gear, and wherein, when the motor is driven, one of said two planet gears is selectively engaged with the transmission gear, for causing the drive force of the motor to be transmitted to the driven gear section, and, when the motor is not driven, the two planet gears are urged by the spring to be disengaged from the transmission gear.

10. The zoom lens assembly according to claim 8, wherein the control means operates to determine the direction in which the operation ring is to be rotated in accordance with data on the direction of the displacement of the position of the image forming plane from the film surface which date are furnished by the detection signal sent from the light-receiving element, and to cause the operating ring to be rotated to such extent that the detector contact means counts that number of patterns which corresponds to the displacement between the position of the image forming plane and the film surface, for the respective focal lengths.

11. The zoom lens assembly according to claim 9, wherein the driven gear section is formed in part of the bottom peripheral wall of the operation ring.

12. The zoom lens assembly according to claim 11, which further comprises a cover which is fixed with respect to the stationary hollow cylinder and includes a first section for enclosing the driven gear section over its range of rotational movement, and a second section which is formed contiguous to the first section to enclose the bottom of the operation ring wherein the motor is mounted within said second section of the cover.

* * * * *